(12) United States Patent
Kelly et al.

(10) Patent No.: US 8,014,761 B2
(45) Date of Patent: Sep. 6, 2011

(54) MOBILE DEVICE THAT USES REMOVABLE MEDIUM FOR PLAYBACK OF CONTENT

(75) Inventors: Declan P. Kelly, Eindhoven (NL); Jozef P. Van Gassel, Sevenum (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 10/539,330

(22) PCT Filed: Dec. 12, 2003

(86) PCT No.: PCT/IB03/05995
§ 371 (c)(1),
(2), (4) Date: Jun. 15, 2005

(87) PCT Pub. No.: WO2004/055807
PCT Pub. Date: Jul. 1, 2004

(65) Prior Publication Data
US 2006/0121878 A1 Jun. 8, 2006

Related U.S. Application Data

(60) Provisional application No. 60/434,058, filed on Dec. 17, 2002.

(51) Int. Cl.
*H04M 3/42* (2006.01)
(52) U.S. Cl. ............ 455/414.1; 455/466; 455/411; 705/14.1; 705/15
(58) Field of Classification Search .......... 455/411, 455/419, 558, 420, 414.1, 466; 705/14, 57, 705/14.1–15
See application file for complete search history.

(56) References Cited

U.S. PATENT DOCUMENTS

| 6,243,328 | B1 | 6/2001 | Fenner | |
| 6,295,555 | B1 | 9/2001 | Goldman | |
| 6,356,752 | B1 * | 3/2002 | Griffith | 455/406 |
| 6,470,138 | B1 | 10/2002 | Park et al. | |
| 6,874,018 | B2 * | 3/2005 | Wu | 709/219 |
| 6,907,239 | B1 * | 6/2005 | Sivula | 455/406 |
| 6,975,851 | B2 * | 12/2005 | Boesjes | 455/406 |
| 2001/0016834 | A1 * | 8/2001 | Yamanaka et al. | 705/40 |
| 2001/0023403 | A1 | 9/2001 | Martin | |

(Continued)

FOREIGN PATENT DOCUMENTS
DE 19916846 A1 10/2000
(Continued)

OTHER PUBLICATIONS

Royal Philips Electronics press information entitled:, "Philips Develops Technology for Small Form Factor Optical Storage", Jun. 18, 2002.

(Continued)

*Primary Examiner* — Kamran Afshar
*Assistant Examiner* — Dung Lam

(57) ABSTRACT

A service that provides playback of media content, that may include advertising content, to a user. The system comprises device, that may be a portable wireless device, where the wireless device has a media drive and an application that reads content from a medium inserted in the media drive. The system further comprises a service that communicates with the wireless device via a wireless network. The service provides control commands to the application program for controlling playback of content from the medium when inserted in the media drive. The service may also provide advertising content to the user based on a user profile. A fee may be paid for the delivery of the content and/or the advertising to the user.

32 Claims, 2 Drawing Sheets

U.S. PATENT DOCUMENTS

| | | | |
|---|---|---|---|
| 2001/0041053 A1 | 11/2001 | Abecassis | |
| 2001/0052028 A1 | 12/2001 | Greenberg | |
| 2001/0053686 A1 | 12/2001 | Hovestadt | |
| 2002/0048224 A1 | 4/2002 | Dygert | |
| 2002/0095674 A1* | 7/2002 | Lowthert et al. | 725/32 |
| 2002/0095675 A1* | 7/2002 | Lowthert et al. | 725/34 |
| 2002/0141582 A1* | 10/2002 | Kocher et al. | 380/201 |
| 2002/0154779 A1* | 10/2002 | Asano et al. | 380/277 |
| 2002/0177449 A1* | 11/2002 | McDonnell et al. | 455/456 |
| 2003/0046548 A1* | 3/2003 | Brown et al. | 713/182 |
| 2003/0104840 A1* | 6/2003 | O'Hare et al. | 455/566 |
| 2003/0125012 A1* | 7/2003 | Allen et al. | 455/406 |
| 2004/0003398 A1* | 1/2004 | Donian et al. | 725/34 |
| 2004/0125957 A1* | 7/2004 | Rauber et al. | 380/259 |
| 2004/0133794 A1* | 7/2004 | Kocher et al. | 713/193 |
| 2004/0197084 A1* | 10/2004 | Tagawa et al. | 386/95 |
| 2004/0220926 A1* | 11/2004 | Lamkin et al. | 707/3 |
| 2007/0101139 A1* | 5/2007 | Bayer et al. | 713/168 |

FOREIGN PATENT DOCUMENTS

| | | |
|---|---|---|
| DE | 19936720 A | 2/2001 |
| EP | 0443933 A1 | 8/1991 |
| EP | 1107254 A | 6/2001 |
| EP | 1107254 A2 | 6/2001 |
| JP | 2002334255 A | 11/2002 |
| WO | WO 00/62564 | 10/2000 |
| WO | WO 02/089111 A1 | 11/2002 |

OTHER PUBLICATIONS

Philips Reseach document entitled, "Video Clip on Small Form Factor Optical Storage" Nov. 15, 2002.

* cited by examiner

MOBILE DEVICE THAT USES REMOVABLE MEDIUM FOR PLAYBACK OF CONTENT

CROSS REFERENCE TO RELATED APPLICATION

This application claims the benefit of U.S. provisional application Ser. No. 60/434,058 filed Dec. 17, 2002, which is incorporated herein by reference.

The invention relates to a method and apparatus for providing audio, visual or other content to a device connected to a network There are a number of ways to provide content (such as audio and video) to a device such as a PC over a wired network, such as the Internet. For example, streaming audio wherein a user at a PC receives a radio broadcast that is streamed via the wired network from the radio station server has become popular. Streaming video is also known, such as video clips in the form of advertisements, news segments, etc. that are also commonly sent over the Internet to a user's PC, where it may be played.

As another example, MP3 audio files comprising a song or songs are often transferred over the Internet. Such transfer may be, for example, a download from a commercial website after purchase, or it may be via an e-mail attachment from a friend.

Transferring content is typically facilitated in a wired network because of the large bandwidth that allows for the content to be transferred relatively quickly. The fast transfer of data over the wired network allows the data to be downloaded so that the content is played continuously for a user, as in the case of streaming audio or a video advertisement in a pop-up ad. For large content files (such as audio and picture files) that are not streamed, the large bandwidth of a wired network makes such transfers over the network feasible.

Transfer of large amounts of content over a typical wireless network is not feasible due to the low bandwidth of most wireless networks. Thus, streaming audio and video to a mobile phone is not feasible because the bandwidth does not provide a data transfer that allows the audio or video to sound or appear continuous to the user. Providing sufficient bandwidth to the user in a mobile network may be prohibitively expensive. Downloading a large content file that is not intended for streaming is technically possible. For example, transfer of photos over wireless network is now becoming popular. However, transfer of large audio and photo files for viewing is still time consuming over a wireless interface.

Among other things, it is an objective of the invention to provide content to a device connected to a wireless network that is not constrained by the bandwidth of the wireless network. It is also an objective to provide at least a portion of such content directly to a device under controls exerted over the wireless network.

Accordingly, the invention provides a system for providing playback of media content to a user. The system comprises a portable wireless device, where the wireless device has a media drive and an application that reads content from a medium inserted in the media drive. The system further comprises a service that communicates with the wireless device via a wireless network. The service provides control commands to the application program for controlling playback of content from the medium when inserted in the media drive.

The invention also provides a portable wireless device that interfaces with a wireless network. The wireless device is comprised of a media drive and an application. The application plays content from a medium when inserted in the media drive, wherein the content from the medium is played based upon control commands received from a service via the wireless network.

The invention also provides a service for use in providing playback of media content to a user. The service generates and transmits control commands via a network to a portable wireless device. The control commands control playback of content of a medium inserted in a media drive of the wireless device.

The invention also provides a medium that contains content. The medium can be inserted into a media drive of a portable wireless device. The medium is readable for playback of the content by an application stored in the wireless device when control commands are received by the application from a remote service.

In addition, the invention provides an application program stored on a portable wireless device. The application reads and plays back content from a medium inserted into a media drive of the wireless device in accordance with control commands received by the wireless device from a remote service via a network.

Figure 1:
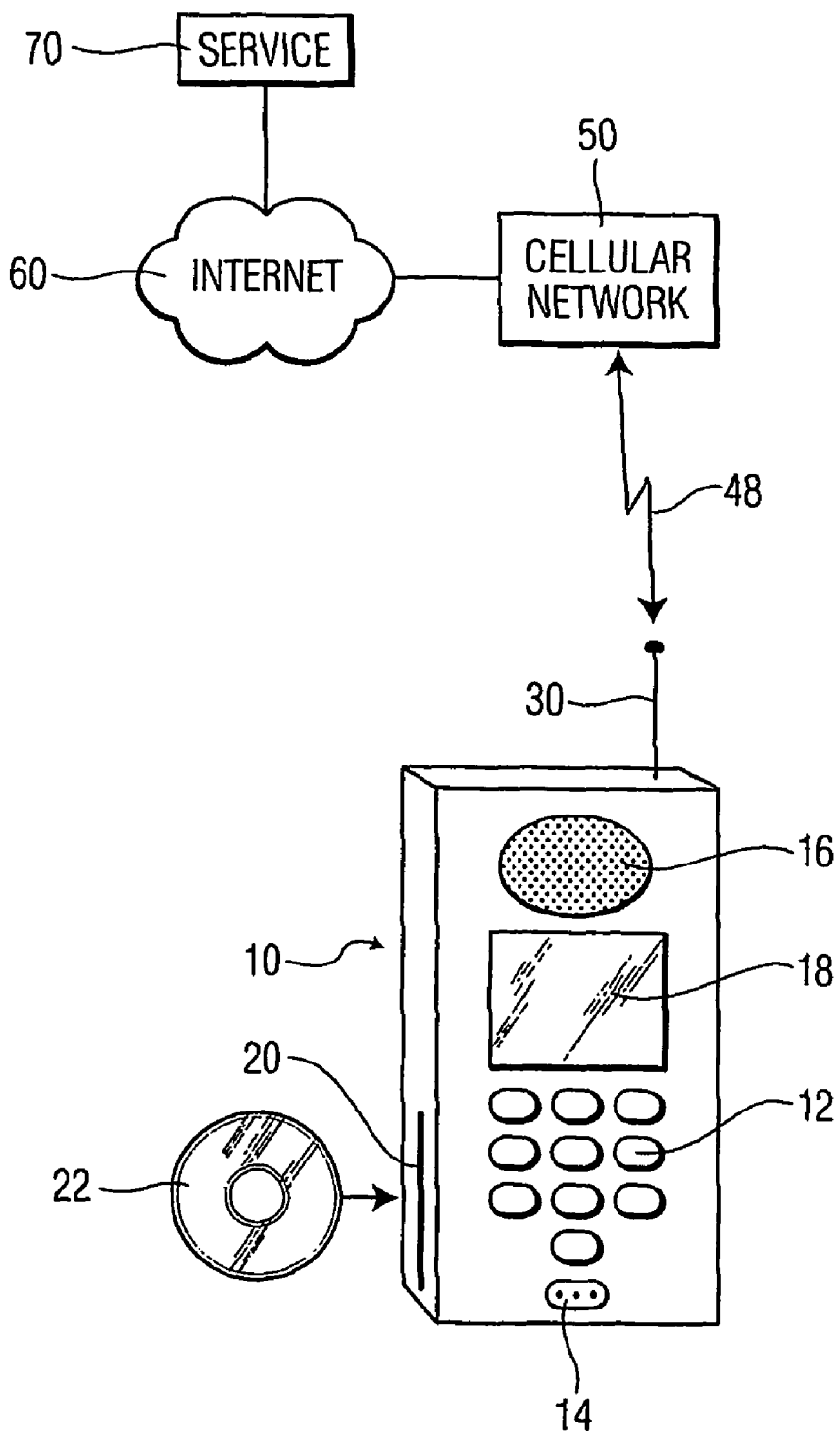
FIG. 1 is an embodiment of a system in accordance with the invention.

Referring to FIG. 1, a basic system that supports the present invention is shown. The system is comprised of a mobile phone 10 that interfaces with cellular network 50 over air interface 48. Cellular network 50 is connected to the Internet 60 in any of a number of ways that are well-known in the art. For example, mobile phone 10 may communicate with a local base station (BS) that is connected to a mobile switching station (MSC) that in turn is connected to the Internet 60. Service 70 is one of the many servers connected to the Internet 60 and is described further below.

Mobile phone 10 is comprised of a number of standard features, including keypad 12, microphone 14, speaker 16 and display 18. Mobile phone 10 is configured for voice and data (including Internet) service, in any of a number of ways that are well-known in the art. Mobile phone 10 also includes media drive 20, which is depicted in this embodiment as an optical disc drive for receiving miniature optical disc 22. Other drives for other media, such as magnetic discs and flash memory, may alternatively be used.

Figure 2:
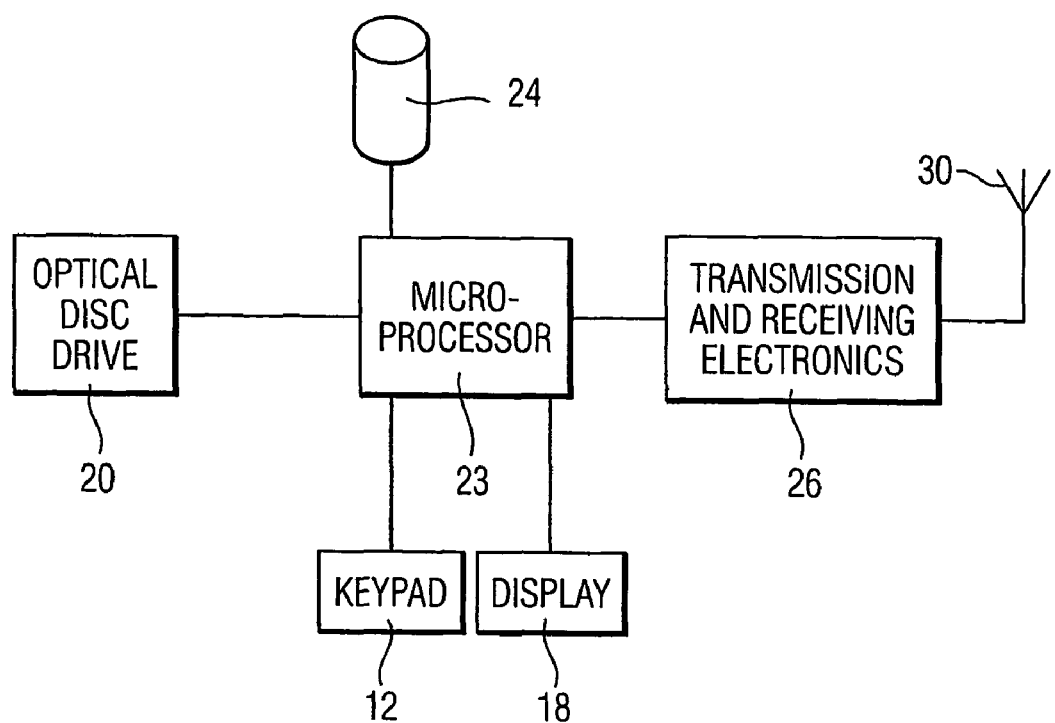
FIG. 2 is a diagram of a number of the components of the mobile phone of FIG. 1.

Referring to FIG. 2, a number of components of mobile phone 10 are represented. Optical disc drive 20 is controlled by microprocessor 23 of mobile phone 10 and provides data read from optical disc 22 to microprocessor 23 under appropriate circumstances. Microprocessor 23 has associated memory 24 which may provide temporary storage and application programs for the various functions of the mobile phone 10. Microprocessor 12 may receive input under appropriate circumstances from keypad 12 and provide display output to display 18 under appropriate circumstances. Microprocessor also interfaces with and controls transmission and receiving electronics 26 of the wireless phone 10 to transmit and receive voice and data signals over the wireless interface 48 via antenna 30. Other functions of the mobile phone 10, such as the speaker 16 and microphone 14, are omitted from FIG. 1 for simplicity.

Referring to FIGS. 1 and 2 together, optical disc 22 includes content, such as audio or visual content. When inserted in optical disc drive 20, microprocessor 23 invokes application software or program for the disc 22. Such application software pertinent to disc 22 may be stored in memory 24 or may be read from disc 22 itself. The application program does not allow the content of the disc 22 to be immediately accessible by the user via mobile phone 10. In addition, the content portion of disc 22 may be encrypted and require a key for access as is known in the art.

Access to the disc is controlled by a service that is accessible through the network, such as service 70 shown in FIG. 1. The application program (also referred to below as the "application") run by microprocessor 23 is able to read from disc 22 the protocols needed to connect mobile phone 10 with service 70. For example, the application may read the Internet address of service 70 from disc 22 and initiate the connection between mobile phone 10 and service 70 via the air interface 48, cellular network 50 and Internet 60 in a manner that is well-known in the art. Alternatively, the Internet address of service 70 may be stored in memory 24 or in the code of application for retrieval. If a number of addresses of different services are stored, the pertinent one may be selected based upon data accessible from a number of sources including disc 22, memory 24, or directly from the user.

Application program run by microprocessor 23 may also access additional disc information from disc 22, such as a disc identifier where disc 22 is a mass produced ROM disc. Once the connection is made between the mobile phone 10 and the service 70, microprocessor 23 may transmit the disc information to service 70. Once received, service 70 returns appropriate content access and/or control data ("control commands") to microprocessor 23, which is used by application program to access and/or play the content on the mobile phone 10 in the manner directed by the control commands. In one embodiment, control commands may be time limited so that control commands will only operate for a given duration prior to requiring mobile phone 10 to connect to service 70 for further control commands. This ensures that content on disk 22 may not be accessed by someone not authorized to connect to service 70 in that new control commands are required after the given duration. If the content of disc 22 is encrypted, the control commands may include the key(s) needed for decryption; Subsequent control commands may also be sent from service 70 and may be based on input from the user and/or the application program.

For example, disc 22 may be a ROM disc containing five songs for promotion. The identity of the particular disc is accessed by application program and sent to service 70. Service 70 sends back a key to decrypt the song content of identified disc 22 along with commands to application program to playback the songs in sequence. Application program decrypts the songs and plays them over speaker 16 of mobile phone 10 using a sound card (not shown) or other audio software application accessed by microprocessor 23. (Alternatively, headphones may be plugged into a auxiliary jack of mobile phone 10.)

The application program may also play songs contained on the disc 22 in an order specified by the control data received from service 70. A 1 gigabyte small form factor optical storage (SFFO) disc from Royal Philips Electronics can hold up to 23 hours of CD quality audio, which is thus capable of storing hundreds of songs. Even an optical disc 22 having less capacity may store a large number of promotional songs. Service 70 may direct application via control commands to only playback selected songs from disc 22 in a select order. Such songs may vary based on the time of day, date, etc. Alternatively, the application may provide user with a menu on display 18 that allows user to select a genre, group, etc. of songs for playback. Such selection is sent to service 70 and a playback list is sent to application program containing songs from disc 22 corresponding to the selected content.

More or less control may be asserted by service 70 over playback. For example, control commands generated by service 70 may grant initial access to the disc 22 to application, after which the user may control playback from the disc 22. Thus, service 70 exerts substantially no control over playback after access is granted. It is noted that although application program generally will not allow user access to content of disc 22 without control commands sent from service 70 over network, in the case where application program may be altered, encryption ensures that the network connection with service 70 is still required. Authentication of the application by service 70 may also be required before an encryption key for the disc content is transmitted from service 70. Such authentication of the application may be performed using any of a number of well-known authentication procedures, such as watermarking, public key/private key, etc. Where the content is encrypted on the disc 22 and keys are distributed over the network, existing copy protection systems may be used.

In another embodiment, the control commands may need to be sent repeatedly to maintain playing of the content. In this embodiment, the mobile phone 10 may need to stay connected or more need to reconnect to the service 70 for the content to continue playing. This may be accomplished by making the control commands time sensitive, so that after a time, the control commands expire. Thereafter, an expired control command would be replaced by an unexpired control command by the service 70.

In addition, additional content such as advertisements may be stored on disc 22 and retrieved for display or playback by application program at the appropriate time. For example, application program may retrieve a sequence of advertisements from disc 22 and insert them between songs that are played back. Application may also send a list of advertisements contained on disc 70 to service and receive control commands from service 70 directing which advertisements to insert in the playlist and when. Alternatively, service 70 retrieves a list of advertisements contained on disc 22 from memory using a disc 22 identification received, and then generates control commands directing which advertisements to insert in the playlist and when.

As noted, when a mobile phone 10 connects with service 70 and the disc 22 identification (ID) is sent to service 70, service 70 may transmit control commands that comprise the entire playlist to be played from the content on disc 22. In that case, when the user inserts the disc 22, the mobile phone 10 receives the same playlist as everybody else for disc 22, but application program will play the list from beginning to end for the particular user. Alternatively, service 70 may continually send control commands for the particular disc 22 over the network for any user listening to disc 22. Thus, when a user inserts disc 22 and application begins running, the most current control commands are transmitted to the application program by service, which responds by playing the appropriate current content from the disc 22. In this case, every user who has the particular disc 22 inserted in their respective mobile phone 10 listens to the same sequence of songs at substantially the same time.

Service 70 may provide additional content in the form of advertisements, for example, that are displayed to the user on display 18 or played to the user between songs. Advertisements may be downloaded and stored in memory 24 of mobile phone 10, and inserted by application program at the appropriate time based on control commands from service 70. Such downloading and storing of advertisements from service 70 may occur during playback of a song or songs by application program from disc 22. Thus, despite the narrow bandwidth of the wireless network, an advertisement (or advertisements) will typically be completely downloaded by the time it is needed for display or playback. In this scenario, advertisements are effectively "broadcast" by service 70 to the user of the mobile phone 10 while the songs themselves are played from disc 22. Where advertisements are generally broadcast in such a manner by service 70 to all listeners (or to all listeners of a particular disc 22), the bandwidth for the advertising broadcast by service 70 is relatively low with respect to the customized advertising discussed below.

In addition, the advertisements may act as the control commands such that the listening to one or more advertisements may grant access to the playing of content from the disc 22. These advertisements may be transmitted from the service 70. The playing of the advertisement then enables the application program to play one or more content portions from the disk 22. This embodiment provides an incentive to the user to play the advertisements that may be related or unrelated to the content portions.

It is noted that even where advertisements are generally broadcast by service 70, some customization may be possible, for example, based on geography. Service 70 may broadcast advertisements as a function of the cell of the cellular network 50 from which it is broadcast. The particular set of advertisements may be directed to the appropriate cell based on the address of the base station or by specifying the users in the particular cell according to other protocols of the cellular network 50. Such geographic based advertising is particularly suited to advertising by local merchants. For example, service 70 may direct advertisements for a restaurant located in a particular region to users found in one or more cells in the geographic region. Thus, users listening to the content of disc 22 may be directed to the nearby restaurant.

In the above exemplary embodiments, the pertinent data sent from mobile phone 10 to service 70 included the disc 22 identification. Once received, service 70 transmitted content control commands and advertisements (where applicable) over the network to mobile phone 10 based on the identification of disc 22 alone. In alternative embodiments, the system may be configured so that content (and advertising) is customized to the user of the mobile phone 10. Thus, when disc 22 is inserted, application program again begins running and initiates a network connection between mobile phone 10 and service 70. Disc 22 ID is again transmitted by application program to service 70 over the network connection. Service 70 also receives an identification relating to the user over the network. The user may be identified by a user ID that is previously selected and stored in memory 24 of mobile phone 10 and then retrieved and sent to service 70. Alternatively, application may provide an input on display 18 of mobile phone 10 whereupon user inputs his/her ID via keypad 12.

The application program may alternatively send the identification of the mobile phone 10, such as the electronic serial number, which is particularly suitable where the network protocols rely on a dedicated data connection (such as GSM). The mobile phone 10 ID acts as a surrogate to identify the user of the mobile phone to service 70. Where the network protocols rely on packet based data transfer (such as CDMA, UMTS), the address of the mobile phone 70 is included in the packet header, thus identifying the mobile phone 10 to the service 70 when the disc 22 ID is transmitted. In such cases, application program need not send the mobile phone 10 identifier and the mobile phone address may act as a surrogate to identify the user of mobile phone 10 to service 70.

The user ID and/or the disc 22 ID is used by the service 70 as an identifier to customize for the particular user the content that is played back from disc 22. Thus, service 70 uses the user ID as an index to retrieve preference data pertinent to the user of the mobile phone 10 that is stored in a database of service 70. The user preferences may be used by service 70 to select particular content on the disc 22 for playback to user. Control commands for the playback of the selected content are formatted by service 70 and sent via the network connection to the application program. If there is a dedicated data connection between service 70 and mobile phone 10, the control commands are sent via the data connection. If there is a packet protocol, then the control commands are returned to the address of mobile phone 10. (As noted, such an address is known to service 70, for example, from the header of data previously sent by the application to service 70.) The particular content selected according to the user preferences is subsequently played from the disc 22 by the application program.

Preferences for users may be obtained by service 70 in a number of manners. For example, they may be manually input and subsequently updated by a user using a PC interfacing with the service's 70 website. Alternatively, they may be manually input by a user via mobile phone 10 by selecting a menu of the application program, which then sends the preference to service 70, where it is stored indexed by the user ID. Alternatively, the application program may request the user select a preference from a menu of choices each time a disc 22 is inserted, and send the preference along with the disc ID to the service 70. (In such a case, where the preference is always transmitted, service 70 need not store the preference for the user.)

For example, user of mobile phone 10 inserts disc 22 into optical disc drive 20, thereby initiating application program, similar to the prior embodiments. Application program retrieves the network address of service 70 from a non-encoded area of disc 22 and initiates a network connection with service 70 via cellular network 50 and Internet 60. Application program transmits disc 22 ID and a user ID (obtained in one of the manners described above) to service 70 via the network connection. Service 70 uses the user ID as an index to retrieve from memory a content preference for user from a preference database. Service 70 also retrieves from memory a complete playlist of songs on disc 22 from memory using the disc 22 ID. The user's content preference is used by service 70 to select particular songs corresponding to the preference from the complete playlist. Control commands corresponding to the select songs (identifying a preferred playlist for the user) are formatted and transmitted from the service 70 to application program. The songs comprising the preferred playlist are selected from the disc 20 and played in sequence by the application program.

Advertisements sent from service 70 for insertion by application program may likewise be customized to a particular user. For example, advertisements may also be selected and transmitted based on the user's preference retrieved from service 70 database. For example, the selected advertisements where a user's preference is "rock music" may be different than when a user's preference is "jazz". How service 70 is programmed to direct particular ads based on user preference may be determined, for example, by the ad sponsors, marketing studies, etc.

As an alternative to the user manually inputting his or her content preferences to service 70, service 70 in conjunction with application program may monitor the user's listening behavior and create, store and update customized preferences for the user in the service database. For example, when a promotional disc 22 is first inserted, service 70 may transmit control commands that direct application program to play a playlist comprised of a variety of types of songs contained on disc 22. Application program may monitor the user's reaction based on input to the mobile phone 10 and transmit the monitoring data to the service 70.

For example, if the user increases the volume during a particular song, the application may transmit an indicium to the service 70 that the user likes this song. Conversely, if the user lowers the volume (or if the application allows the user to skip to the next song on the playlist), the application may transmit an indicium to service 70 that the user dislikes the song. In an embodiment wherein, the user directs the content for playback, the server 70 may monitor the selected content, the frequency of selected content, etc. to further update the customized preferences. The application may also allow the user to provide direct feedback regarding the songs using keyboard 12, for example, one key for "like" and one for "dislike". Service 70 may use the types of songs and the indicium to develop and refine a musical preference for the user that is stored for user. The preference may be refined beyond a broad-genre (such as "rock music"), for example, to identify sub-genres (such as "heavy metal rock music") and/or particular musicians in the genre. Once a user preference is sufficiently developed, service 70 may concurrently use the preference to select particular content from an inserted disc 22 for playback to the user, as described above.

In analogous manner, preferences of a user for advertisements may likewise be customized. Application program may also monitor the user's reaction to advertisements based on input to the mobile phone 10 and transmit the monitoring data to the service 70. For example, lowering the volume may indicate a commercial that the user is not interested in, while raising the volume may indicate a commercial that the user is interested in. Service 70 may use the types of commercials and the interest level to develop and refine a commercial preference for the user. Based on the commercial preference of the user, particular commercials that fall within the user's preference may subsequently be targeted for transmission to the user.

It is noted that where playlists and/or advertising are customized to the preferences of end users, the bandwidth requirements of service 70 are increased. Each customized control command must be separately transmitted to the particular end user (or small group of end users), whereas when the playlists are not customized, it is possible to transmit one set of control commands to all users.

In the above examples, disc 22 was a ROM disc that held pre-stored content, such as a group of songs for promotional distribution. ROM discs, of course, may be mass produced and distributed. This would allow, for example, the promotional discs to be distributed for free in a bin at a chain of convenience stores. Every few weeks or so, a new promotional disc may be mass marketed.

In that regard, discs 22 may have a limited lifetime, after which service 70 will not allow playback of the content. Once users cannot play a disc 22 that has been retired by service 70, users will seek out the newly distributed discs with new promotional songs. However, it is noted that miniature optical discs such as the 1 GB Philips SFFO is capable of holding up to 23 hours of CD quality audio and about 34 hours of FM radio quality. Even smaller capacity discs 22 will generally have sufficient content to keep users interested for a relatively long period of time, especially if playlists are varied over time. Accordingly, new discs may be distributed and enabled (and old discs retired), for example, on the order of every few weeks or a month.

In addition, the songs themselves (the individual content portions) may have a limitation on the number of times that the songs may be played before being retired. In that way, songs may be provided that may be played for a time, and thereafter, are not able to be played. Song promoters may provide the disks as a promotion to enable users to hear new songs and thereafter, when the song is no longer enabled to be played, entice the users to purchase the songs. The service 70 may control the number of times that a song is enabled to be played through the control commands or the song itself may contain information, such as a watermark and ticket, which is known in the art. The updating of the ticket may be maintained at the service 70, or may be maintained locally in the phone 10. In a system wherein the playlist is under the control of the user, the number of times that a given song is played may be transmitted to the service 70 as a means of providing feedback to the song promoters as to the level of interest in a given song. This may be utilized by the song promoters, for example, to determine which songs should be broadly distributed.

Alternatively, a time limit or play limit might not be imposed on the discs 22 themselves or the songs, but a playback limit may be imposed on each user with respect to the disc 22. In this case, for example, a user ID is sent with the disc ID to service 70 as described above. Service 70 may keep track of how many songs from disc 22 have been played back for the user, how long the user has been playing the disc 22, or other limitation factor. Where service 70 keeps track of how long user has been playing disc 22, the total amount of playback time, the number of days over which the user has played the disc 22, or other time limitation factor may be tallied for the user. When the limitation factor exceeds a threshold for the user, service 70 no longer allows playback of the particular disc for the particular user. However, the user may then give the disc to a new user, who will be able to use the disc 22 for playback in his/her mobile phone until the playback time limitation is exceeded for the new user.

Alternatively, disc 22 may be a recordable disc, such as a recordable ("R") disc and/or re-writable ("RW") disc. In that case, the user may select the content to be downloaded onto the disc, thereby customizing the content The user may download the content via a PC by connecting with the service 70 website (thus allowing a rapid download due to the high bandwidth). Alternatively, for example, a user may select the content to be downloaded at a kiosk maintained in a commercial setting, such as a chain of convenience stores. If the user has a RW disc that he or she wants to reuse, the user may be prompted to insert the disc into the kiosk drive. The selected content downloaded to disc may be encoded, along with a disc identifier for the customized disc.

When the user inserts the customized disc into the disc drive 20 of mobile phone 10, application program starts, a network connection between mobile phone 10 and service 70 is initiated and the disc identifier is sent to service 70. Playback of the content from the disc 22 is controlled by control commands from service 70. This may include transfer of a key to decrypt the disc 22 (retrieved from memory of service 70 using the disc identifier). Generally, the application will play the content in order, since it was selected by the user. However, the control commands from service 70 may specify a playlist in order to emphasize a particular song (or songs) for promotion. In addition, the service 70 may download advertisements for insertion between songs based upon the genre of songs selected by the user. The types of songs selected by the user for downloading may be used to develop user preferences for advertisements and suggestions for later content downloads.

As described above, the systems of the invention support a number of inventive business methods. As noted, the discs 22 are typically given away free of charge so that users are enticed to obtain them and engage service 70 using their mobile phones 10 via network in order to play the disc 22. The business that runs service 70 typically distributes discs 22 (or downloads songs to discs 22 if they are R/RW discs), although separate businesses (that coordinate their efforts) may provide the service 30 and the discs 22.

As described, the application program of mobile phone 10 does not play the content of disc 22 unless the phone 10 is connected to service 70 via network (shown in FIG. 1 to be cellular network 50 and Internet 60). Application program receives control commands from service 70 for playback of the content, and may also require a key for decrypting the content from service 70.

The business provider of service 70 may have one or more of a number of revenue streams:

1) The network connection between the mobile phone 10 and service 70 may be charged to the user. For example, cellular network 50 may charge user of mobile phone 10 per minute for the connection with service 70. Service 70, in turn, may have an agreement with cellular network 50 to receive a percentage of the connection charge. Alternatively, cellular network 50 may provide a free connection to users and even pay service 70 for providing the service, in order to attract new cellular subscribers.

2) As described, service 70 may also control playback of the content so that advertisements are inserted, for example, between playback of songs, or at the beginning of each short set comprised of a few songs. Service 70 may collect a fee from the advertisers each time an advertisement is broadcast. In the case described above where advertisements are generally broadcast by service 70 to all users of disc 22, service 70 may collect a relatively larger fee due to the number of people exposed to the ad. On the other hand, where particular advertisements are directed at users in a customized fashion (based, for example, on a stored user preference as described above), the volume of users exposed to any one advertisement is reduced. However, the effectiveness of the customized advertising may also justify a premium fee.

3) Service 70 may also collect a promotional fee for playing the content included on disc 22. For example, where the content includes songs that are played in one of the manners previously described, service may collect a fee from the record company (or artist, or other commercially interested party) for playing a particular song. Since, as described, service 70 controls playback of the content on disc 22 via the network connection, the fee may be based, for example, on the number of times the particular song is played by all users. Alternatively, a flat fee may be charged to the record company for including the particular song with the content on the disc 22. Other financial arrangements are possible, such as a flat fee for including the song on the disc and an additional fee if the song is played more than a threshold number of times.

In addition, the record company (or other promoter) may pay to have a particular song played more often for users who connect to the service 70. As noted, service 70 controls the playback of content from disc 22 and may thus direct that a particular playlist be selected from the overall content included on disc 22. Where the record company pays the requisite fee, the playlist selected by service 70 includes the particular song. If the playlist is subsequently changed, it may still include the particular song, even though other songs selected from the disc 22 may change. The record company may pay such a fee to cover a particular period of time for such increased frequency of playback. As part of this promotional service, or for an additional fee, the record company may also request service 70 completely exclude the particular song from the playlist at the end of the period of time, with the hope that listeners who have taken a liking to on the song will go out and purchase it.

4) Service 70 may also collect user feedback regarding the content and sell such information to interested parties for a fee. For example, when application program is playing a song from the disc 22, application program may also present to user on display 18 of mobile phone 10 feedback options where the user can select via keypad 12 whether he or she likes or dislikes the song currently being played. Such a display may be made to users by application either routinely or when application is directed by service 70. The application program sends the song identification and selected preference to service 70, which compiles user preferences for the songs contained on the disc 22. Such compilations of listener feedback comprises valuable marketing data for record companies, other promoters of songs, radio stations, or interested parties, and may be sold by service 70 for a fee.

It is noted that the general compilation of user preferences for songs contained on the disc 22 may rely on the same feedback from users that is used by service 70 to create individual preferences for users in its database, as previously described. Thus, both may be carried out by service 70 using such user feedback.

5) In a modification of the above embodiments, the users purchase the content For example, users purchase ROM discs that are sold at various outlets. The playlists are provided by service 70 (for a fee or as part of the purchase price of the disc 22), for example, in the manners previously described. Alternatively, playlists may be downloaded and stored by application in the mobile phone 10 as part of the purchase price of the disc 22, or for an additional fee. Once downloaded, users may exchange playlists over the network. For R/RW discs, users may purchase content which is downloaded onto the disc. The content may optionally be selected by user.

In the above description and examples, audio content and audio discs were focused on. However, it is understood that other content, such as video or a combination of audio and video, may be the content included on disc 22. For such content, application program may play the video content of disc 22 on display 18 of mobile phone 10 under the control of service 70, as described above. Advertisements as described above may also be comprised of video as well as audio. Advertisements may be comprised of video played by application on display 18 even where the content stored on disc 22 is principally or exclusively audio. For example, while songs from disc 22 are being played back according to control commands from service 70, service 70 may also download video advertisements to mobile phone 10 for playback on display 18. Such video advertisements may be played back between songs and/or during playback of the songs.

In addition, other wireless mobile devices apart from mobile phones may be used in the present invention, such as PDAs that have wireless modems. Also, the invention may be applied to devices that are wired directly to networks. For example, in the above description, PCs wired directly to the Internet may be substituted for the mobile phone 10. (Of course, in that case the PC is wired directly to the Internet 60; thus the air interface 48 and cellular network 50 of FIG. 1 is not needed.) Such devices may have drives that receive standard sized CDs and/or DVDs.

In the above description and exemplary embodiments, service 70 connected to cellular network 60 via Internet 60. Other network connections may be substituted for the Internet 60. Service 70 may be networked directly to cellular network 50, or may be a part of the cellular network 50 itself.

Although illustrative embodiments of the present invention have been described herein with reference to the accompanying drawings, it is to be understood that the invention is not limited to those precise embodiments, but rather it is intended that the scope of the invention is as defined by the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., discrete electronic circuitry), software portions (e.g., computer programming), or any combination thereof;

f) any of the disclosed devices or portions thereof may be combined together or separated into further portions unless specifically stated otherwise; and g) no specific sequence of acts is intended to be required unless specifically indicated.

The invention claimed is:

1. A method of enabling an electronic transaction, the method comprising:
   providing storable electronic content to a user via a removable storage medium;
   providing an electronic application to the user, wherein the electronic application is (i) pertinent to the removable storage medium via an identification (ID) of the removable storage medium and (ii) restricts user access to the storable electronic content of the removable storage medium; and
   subsequent to the user being provided with the storable electronic content, providing electronic advertising content to the user accessible via a remote service, the electronic advertising content comprising control commands that are receivable from a party other than the user and that are generated via the remote service,
   wherein the storable electronic content and the electronic application are stored on a portable wireless device,
   wherein providing the control commands comprises connecting the portable wireless device to a server and transmitting the control commands from the server to the portable wireless device,
   wherein the storable electronic content contains a plurality of electronic content portions and wherein corresponding control commands are required to be separately provided each time the electronic application renders one of the plurality of electronic content portions,
   wherein the remote service uses one of (a) a user identification (User ID), (b) the removable storage medium ID, and (c) both the User ID and the removable storage medium ID, as an identifier to customize, for the user, particular portions of the electronic content for playback, and
   wherein responsive to the user selecting and playing the electronic advertising content, the control commands enable the electronic application to render the particular portions of electronic content of the storable electronic content accessible to the user for playback;
   wherein the control commands are separately transmitted each time the electronic application renders the particular portions of electronic content accessible to the user, the method further comprising maintaining a count of a number of times that the control commands for rendering the particular portions of electronic content accessible to the user are transmitted from the remote service to the user.

2. The method of claim 1, further comprising the denying the transmittal of the control commands if the count exceeds a given number.

3. The method of claim 1, wherein the electronic application is only enabled to render the electronic content while the portable wireless device is connected to the server.

4. The method of claim 1, comprising receiving the user identification at the server from the user each time the portable wireless device is connected to the server, and maintaining a count of a number of times the user identification is received from the user.

5. The method of claim 1, wherein the electronic content contains a plurality of electronic content portions and wherein a corresponding control command is required to be separately provided each time the electronic application renders one of the plurality of electronic content portions.

6. The method of claim 1, wherein the electronic advertising content is renderable by the electronic application.

7. The method of claim 6, wherein the electronic application renders the electronic content and the electronic advertising content in a determined order.

8. The method of claim 7, wherein the playing of the electronic advertising by the electronic application renders the electronic content accessible to the user.

9. The method of claim 6, wherein the electronic advertising is provided together with the electronic content.

10. The method of claim 6, further comprising:
    determining a geographic region where the portable wireless device is located;
    identifying electronic advertising for the determined geographic region; and
    transmitting the control commands and the identified electronic advertising from the server to the portable wireless device.

11. The method of claim 1, wherein the control commands control at least one of the selection and order of rendering the electronic content.

12. The method of claim 1, wherein the electronic content is at least one of audio content and video content.

13. A method of enabling an electronic transaction, the method comprising:
    providing storable electronic content to a user via a removable storage medium;
    providing an electronic application to the user, wherein the electronic application is (i) pertinent to the removable storage medium and (ii) restricts user access to the storable electronic content of the removable storage medium; and
    subsequent to the user being provided with the storable electronic content, providing electronic advertising content to the user accessible via a remote service, the electronic advertising content comprising control commands that are receivable from a party other than the user and that are generated via the remote service upon the user selecting and playing the electronic advertising content, the control commands enabling the electronic application to render electronic content of the storable electronic content accessible to the user for playback of the electronic content from the removable storage medium;
    wherein the control commands are separately transmitted each time the electronic application renders the electronic content accessible to the user, the method further comprising maintaining a count of a number of times that the control commands for rendering the electronic content accessible to the user are transmitted from the remote service to the user, wherein the storable electronic content and the electronic application are stored on a portable wireless device, and wherein providing the control commands comprises connecting the portable wireless device to a server and transmitting the control commands from the server to the portable wireless device, wherein the electronic content contains a plurality of electronic content portions and wherein corresponding control commands are required to be separately provided each time the electronic application renders one of the plurality of electronic content portions, the method further comprising:

transmitting a particular control command in response to a request from the user containing a user identification, wherein the request is for the particular control command; and maintaining a count of a number of times each particular control command is transmitted to the user from the server.

14. The method of claim 13, further comprising providing unrequested keys determined from the count of the number of times each particular control command is transmitted to the user from the server.

15. The method of claim 13, further comprising providing the electronic advertising content determined from the count of the number of times each particular control command is transmitted to the user from the server, wherein the electronic advertising content is renderable by the electronic application.

16. A method of enabling an electronic transaction, the method comprising the acts of:

providing storable electronic content to a user via a removable storage medium;

providing an electronic application to the user, wherein the electronic application is (i) pertinent to the removable storage medium via an identification (ID) of the removable storage medium and (ii) restricts user access to the storable electronic content of the storage medium; and subsequent to the user being provided with the storable electronic content, determining electronic advertising, via a remote service, based on a personal profile for the user and providing control commands in the form of the determined electronic advertising to the user, via the remote service, that are receivable from a party that desires the determined electronic advertising be provided to the user, wherein the storable electronic content and the electronic application are stored on a portable wireless device, wherein providing the control commands comprises connecting the portable wireless device to a server and transmitting the control commands from the server to the portable wireless device, wherein the storable electronic content contains a plurality of electronic content portions and wherein corresponding control commands are required to be separately provided each time the electronic application renders one of the plurality of electronic content portions, wherein the remote service uses one of (a) a user identification (User ID), (b) the removable storage medium ID, and (c) both the User ID and the removable storage medium ID, as an identifier to customize, for the user, particular portions of the electronic content for playback, and wherein responsive to the selecting and playing of the electronic advertising by the user, initiating the operation of the control commands enables the electronic application to render the particular portions of electronic content of the storable electronic content accessible to the user for playback;

wherein the control commands are separately transmitted each time the electronic application renders the particular portions of electronic content accessible to the user, the method further comprising maintaining a count of a number of times that the control commands for rendering the particular portions of electronic content accessible to the user are transmitted from the remote service to the user.

17. The method of claim 16, further comprising:
monitoring user selection of electronic content; and
providing an update to the personal profile based on a result of the monitoring.

18. A system for controlling access to content comprising:
a wireless device having a media drive;

an application that accesses electronic content from a removable storage medium inserted in the media drive, wherein the application is (i) pertinent to the removable storage medium via an identification (ID) of the removable storage medium and (ii) restricts user access to the electronic content of the removable storage medium; and a service separate from the device that provides control commands to the application for controlling access to content from the removable storage medium when inserted in the media drive;

wherein the control commands are generated via the service, wherein the electronic content and the application are stored on the wireless device, wherein providing the control commands comprises connecting the wireless device to a server and transmitting the control commands from the server to the wireless device, wherein the electronic content contains a plurality of electronic content portions and wherein corresponding control commands are required to be separately provided each time the application renders one of the plurality of electronic content portions, wherein the remote service uses one of (a) a user identification (User ID), (b) the removable storage medium ID, and (c) both the User ID and the removable storage medium ID, as an identifier to customize, for the user, particular portions of the electronic content for playback, and wherein responsive to by the selecting and playing of advertising content by the user on the device, the control commands enable the application to render the particular portions of electronic content of the removable storage medium accessible to the user for playback; and wherein access to content is restricted by the application in the absence of the control commands; and wherein the control commands are separately transmitted each time the application renders the particular portions of electronic content of the removable storage medium accessible to the user, further wherein the service maintains a count of a number of times that the control commands for rendering the particular portions of electronic content accessible to the user are transmitted from the service to the device.

19. The system of claim 18, wherein the device further comprises a portable wireless device.

20. The system of claim 19, wherein the portable wireless device is a mobile phone.

21. The system of claim 20, wherein the media drive is an optical disc drive.

22. The system of claim 18, wherein the control commands are provided wirelessly to the device.

23. The system of claim 22, wherein the service provides the control commands wirelessly to the device.

24. The system of claim 23, wherein the content is audio and/or video content.

25. The system of claim 18, wherein the control commands determine the order in which the content portions are accessed.

26. The system of claim 18, wherein access to content is controlled by rendering of the advertising on the device.

27. The system of claim 18, wherein the service collects user feedback about the content.

28. The system of claim 27, wherein the user feedback is collected via user manipulation of the device.

29. The system of claim 27, wherein the control commands incorporate the user feedback.

30. The system of claim 18, wherein the insertion of the medium into the media drive initiates a communication between the device and the service.

31. The system of claim 18, wherein the provision of control commands is dependent on a constant communication between the device and the service.

32. The system of claim 18, wherein the control commands control the number of times that content is accessed from the medium.

* * * * *